United States Patent Office 3,502,654
Patented Mar. 24, 1970

3,502,654
PROCESS FOR PREPARING ALKYLENIMINE DIMERS
John D. Young, Mexico City, Mexico, assignor to The Dow Chemical Company, Midland, Mich., a corporation of Delaware
No Drawing. Filed Apr. 12, 1967, Ser. No. 630,193
Int. Cl. C07d 23/02, 23/06
U.S. Cl. 260—239                    12 Claims

ABSTRACT OF THE DISCLOSURE

Alkylenimine dimers are prepared by contacting an alkylenimine (e.g., ethylenimine) with catalytic amounts of an alkali metal salt of the alkylenimine (e.g., potassium ethylenimide) at a temperature of about 50°–200° C. in an inert (e.g., nitrogen) atmosphere under pressure sufficient to maintain the alkylenimine in a liquid phase.

BACKGROUND OF THE INVENTION

This invention relates to a process for dimerizing alkylenimines. More particularly, it relates to a process for preparing an aminoalkyl alkylenimine by dimerization of an alkylenimine at elevated temperatures in the presence of catalytic amounts of an alkali metal alkylenimide.

It is well known that treatment of an alkylenimine with an alkali metal (H. J. Sasse, German 1,040,037) or an alkali metal alkyl (H. Gilman et al., J. Am. Chem. Soc., 67, 2106) will produce the alkali metal salt of the alkylenimine (i.e, the alkali metal alkylenimide) in excellent yield. It is also well known that alkylenimines are frequently purified by distillation from small amounts of an alkali metal (mainly to remove water), wherein the alkali metal acts as an inhibitor to prevent polymerization. Until now, however, it has been unknown that any useful reaction could be promoted by heating an alkylenimine in the presence of an alkali metal alkylenimide.

Other processes exist for preparation of aminoalkyl alkylenimines. For example, the acid catalyzed polymerization of alkylenimines proceeds by way of the formation of aminoalkyl alkylenimines (dimers), trimers, tetramers, etc. and continues until higher polymers are formed (G. D. Jones, "The Chemistry of Cationic Polymerization," ed. P. H. Plesch, MacMillan, New York, pages 521–534). By stopping such a polymerization in its early stages one may obtain some aminoalkyl alkylenimine as one of the products. Such a process is disclosed by Wilson (U.S. 2,553,696) wherein water (a very weak acid) is used as the acid catalyst for polymerization.

Accordingly, one principal object of this invention is to provide a method for dimerizing alkylenimines wherein the alkylenimine conversion to the dimer is substantially complete, without the production in appreciable amounts of trimers, tetramers, or higher polymers.

A further object of the invention is to provide a method for dimerizing alkylenimines wherein competing side reactions are substantially reduced or eliminated.

SUMMARY OF THE INVENTION

It has now been discovered that these and similar objects may be attained by contacting an alkylenimine with an alkali metal alkylenimide catalyst, either preformed or formed in situ by reaction between an alkylenimine and an alkali metal or alkali metal compounds, at a temperature of from about 50° to about 200° C. in an inert as atmosphere under pressure sufficient to maintain the alkylenimine in a substantially entirely liquid phase for a time sufficient to give the desired conversion to alkylenimine dimer. If the catalyst is to be formed in situ, any alkali metal element or compound which will react with an alkylenimine under the conditions of reaction employed herein to produce the alkali metal alkylenimide catalyst may be used. Under these conditions, the conversion to the desired alkylenimine dimer is often substantially complete. Preferably, the alkylenimine is contacted with from about 1 to about 5 weight percent, alkylenimine basis, of potassium metal (which reacts to form the potassium alkylenimide) at a temperature of from about 90° to about 130° C. in a nitrogen atmosphere at a pressure of from about 15 p.s.i.g. to about 4,000 p.s.i.g. for a time of from about 2 hours to about 70 hours.

DETAILED DESCRIPTION OF THE INVENTION

Operable alkylenimines for dimerization according to this invention may be represented by the formula

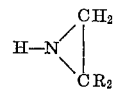

wherein R is, independently in each case, hydrogen or an alkyl group having from 1 to 4 carbon atoms (e.g., methyl, ethyl, n-propyl, i-propyl, n-butyl, sec-butyl, or i-butyl). The term ethylenimine (EI) refers to a compound of the above formula wherein R, in each case, is hydrogen. EI is the preferred alkyleneimine for dimerization according to the present process.

Operable alkali metals and alkali metal compounds for reaction to form the alkali metal alkylenimide catalysts useful in this invention include sodium, potassium, lithium and cesium; the alkali metal alkyls, (e.g. methyl and ethyl sodium, potassium and lithium), the alkali metal aryls (e.g. sodium, potassium and lithium adducts with benzene, toluene, anthracene and naphthalene), the alkali metal amides, (e.g. sodium, potassium and lithium amide), the alkali metal hydrides (e.g. sodium hydride) and the like. Since the actual catalyst in the reaction is the alkali metal alkylenimide, any alkali metal element or compound capable of reaction with an alkylenimine to form the alkali metal for this purpose is potassium metal. In the case of the preformed alkali metal alkylenimides, sodium, potassium, lithium and cesium alkylenimides are operable, wherin the alkylenimide portion has the general formula given above. The preferred preformed alkali metal alkylenimides are sodium and potassium alkylenimide.

When an alkali metal is employed to form the catalyst in situ, it is desirably present in an amount equal to at least about 1 percent by weight of the alkylenimine employed, preferably between about 1 and about 5 weight percent. If an alkali metal compound is employed, it should desirably be employed in an amount sufficient to give an effective amount of the alkali metal equivalent to at least about 1 percent by weight of the alkylenimine. When catalyst precursor much in excess of 5 percent by weight (as alkali metal) of the alkylenimine is used, the reaction rate is increased in the early stages but slows down to a rate equivalent to that for a lesser amount of the alkali metal alkylenimide catalyst as the reaction progresses. Excess catalyst is therefore operable in the present process, but no appreciable advantage is obtained by its use.

The process may be carried out at a temperature between about 50° and about 200° C., preferably between about 90° and about 130° C. With temperatures much greater than about 200° C., degradation of the product and the formation of higher molecular weight alkylenimine polymers occurs. Below about 50 C., the reaction is so slow as to be impractical.

The process is carried out in an inert atmosphere (i.e., non-reactive with the alkyleneimine or catalyst under the reaction conditions employed herein), such as nitrogen, helium, argon, or the like or even the alkylenimine itself, which is non-reactive when out of contact with the catalyst. The preferred inert gas is nitrogen. The reaction is carried out under a pressure sufficient to maintain the alkylenimine substantially completely in a liquid phase, since any alkylenimine that is vaporized is out of contact with the catalyst and therefore unreacted. Oxygen is not inert in this system; it therefore should be excluded. Pressures of from about 16 p.s.i.g. to about 4,000 p.s.i.g. have been found operable, with pressures between about 100 p.s.i.g. and about 1600 p.s.i.g. preferred. It is preferred to generate the pressure autogenically by sealing the reactants and inert gas in a closed vessel and elevating the temperature.

Since water kills the alkali metal alkylenimide catalyst, the amount of water present in the system should be kept as low as posible. If some water is present, more catalyst must be used to compensate for its presence.

The reaction is carried out for a time sufficient to give the desired conversion to alkylenimine dimer. Reaction dimer by infrared spectroscopy and vapor phase chromatography. Where the pure alkylenimine dimer is desired, it may be isolated from the crude product by conventional techniques, such as distillation.

DESCRIPTION OF THE PREFERRED EMBODIMENTS

The following non-limiting examples as set forth in the table describe the invention further. The procedure of the preceding paragraph was used for each example. The detailed reaction conditions and results obtained, when potassium is the alkali metal catalyst precursor are shown in the following table.

In the table, the amount of ethylenimine present as potassium ethylenimide was subtracted from the initial ethylenimine charge before calculating the yield. This was done because the potassium ethylenimide is the catalyst for the formation of the dimer and does not undergo chemical change as a result of the process.

TABLE I

| Example | Ethylenimine, g. | Potassium, g. | Ethylenimine/ potassium mole ratio | Benzene, g. | Triethylamine, g. | Nitrogen p.s.i.g./°C. | Reaction temp. °C. | Reaction pressure p.s.i.g. | Reaction duration, hrs. | Ethylenimine conversion percent | Ethylenimine dimer yield percent | High boiler and others, percent |
|---|---|---|---|---|---|---|---|---|---|---|---|---|
| 1 | 425.2 | 6.1 | 63.2 | | | 15/56 | 56 | 15 | 8 | 2 | >99 | Trace if any. |
| 2 | 490.9 | 10.0 | 62.7 | 2 | | 500/24 | 114 | 700 | 12 | 42.1 | >99 | Do. |
| 3 | 876.4 | 20.4 | 39.0 | | | 500/30 | 130-183 | 800-1,400 | [1] 0.05 | 30 | >99 | Trace. |
| 4 | 432.8 | 10.0 | 39.3 | 441.1 | | 500/25 | 120-123 | 730 | 67 | 46.0 | 99.0 | Balance. |
| 5 | 869.0 | 40.2 | 19.6 | | | 550/27 | 120-198 | 800->4,000 | [2] 0.02 | | | |
| 6 | 864.3 | 40.3 | 19.5 | | | 500/33 | [3] 105-112; 95 | 700 | 7 | 51 | >99 | Trace if any. |
| 7 | 870.8 | 40.1 | 19.7 | 3.1 | | 540/33 | [4] 123-202 | 780->4,000 | | | | |
| 8 | 723.6 | 20.3 | 32.3 | 3.3 | | 200/33 | 100 | 300 | 12 | 53 | >99 | Trace if any. |
| 9 | 342.4 | 20.1 | 15.5 | 4.4 | 288.5 | 250/28 | 125-147 | 525-660 | [5] 0.2 | 46.6 | >99 | Trace. |
| 10 | 349.2 | 19.9 | 15.9 | 3.2 | 288.6 | 200/31 | 155 | 500 | 11 | 41.6 | >99 | Do. |
| 11 | 687.2 | 22.0 | 28.3 | 4.2 | | 220/28 | 95 | 320 | 3 | 30 | >99 | Trace if any. |
| 12 | 694.7 | 25.0 | 25.2 | | | 200/33 | 100-110 | >200 | 68 | 72 | >99 | <1 if any. |
| 13 | 435.1 | 15.1 | 26.1 | | | 250/25 | 240 | 1,230 | 16 | 85 | 18 | Balance. |

[1] Reaction temperature actually actually was above 100° for a total of 2 hours.
[2] Run was lost when rupture disc blew. Residual liquid in autoclave was pure ethylenimine dimer. Solids were found to be potassium ethylenimide.
[3] Temperature was increased gently and exotherm found to occur at 105°. Exotherm expended at 112° C. in about 2 hours, heating continued at 95° 4 hours.
[4] Run lost when rupture disc blew.
[5] Total reaction time could be considered 3 hours during which temperature exceeded 100°.

times of from a few minutes to about 70 hours have been found operable. In the case of ethylenimine, no particular advantage is obtained by carrying the reaction out much longer than about 12 hours; the major part of the reaction occurs during that time.

The reaction involved in the process of this invention is highly exothermic, and means for maintaining the reaction temperature within the limits specified is necessary. Such heat control may be obtained through the use of an inert solvent. Alternatively, the solvent may be omitted and external cooling means employed. Examples of such inert solvents (which must be nonreactive with the alkylenimine and the alkali metal catalyst under the reaction conditions employed) and which may be used either singly or as mixtures) include the aliphatic hydrocarbons containing from about 4 to about 10 carbon atoms, such as n-butane, n-pentane, iso-hexane, n-heptane, iso-octane, n-decane, and the like; cycloaliphatic hydrocarbons such as cyclohexane, alkyl substituted cyclohexanes (e.g. 2-methyl- and 2-ethyl-cyclohexane), and the like; aromatic hydrocarbons, such as benzene, toluene, and the like; trialkylamines, such as trimethylamine, triethylamine, tripropylamine, and the like. The preferred solvents are benzene and triethylamine.

In practice, the process of the present invention is desirably carried out in a stainless steel rocking autoclave. The alkylenimine, alkali metal alkylenimide catalyst or its precursor, and solvent (if used) are charged to the autoclave. Dry nitrogen is employed to purge the autoclave before closing. After closing the autoclave is charged with dry nitrogen. The reactants are heated to initiate the reaction, and the alkylenimine is allowed to dimerize. Upon completion of the reaction, the autoclave is cooled, vented, and the reaction mixture withdrawn as crude product. This crude product is analyzed for alkyleneimine conversion and yield to alkylenimine The above table shows that when potassium is the alkali metal catalyst precursor, the process of this invention is substantially specific to the preparation of the alkylenimine dimer. Substitution of other alkylenimines as described herein, such as 1,2-propylenimine, gives similar advantageous results.

EXAMPLE 14—USE OF SODIUM HYDRIDE

Ethylenimine (25 g.) and sodium hydride (0.7 g.) were heated together under an argon atmosphere in a stainless steel autoclave at 100° C. for 24 hours. Analysis of the product by VPC techniques showed that the conversion of ethylenimine was 71% and the yield of dimer based on this conversion was 60%.

EXAMPLE 15—USE OF SODIUM AMIDE OR LITHIUM METAL

Substitution of sodium amide or lithium metal in the procedure of Example 14 produced crude products which were shown by VPC analysis to contain 1-(2-aminoethyl)-aziridine.

EXAMPLE 16—USE OF BUTYL LITHIUM

Ethylenimine (25 g.) and 25 ml. of a 14% solution of butyl lithium in hexane were heated together under an argon atmosphere in a stainless steel autoclave at 100° C. for 88 hours. The conversion of ethylenimine was 50% and the yield of dimer was 50%.

Substitution of other alkali metal alkylenimide catalysts, as described previously, either as preformed alkylenimides or as alkylenimides formed in situ, gives similar advantageous results.

What is claimed is:

1. A process for preparing an alkylenimine dimer which comprises contacting an alkylenimine with a catalytic amount of an alkali metal alkylenimide catalyst or precursor thereof at a temperature of from about 50° to about 200° C. in an inert atmosphere under pressure sufficient to maintain the alkylenimine substantially completely in a liquid phase for a time sufficient to give the desired conversion to alkylenimine dimer.

2. A process as in claim 1 wherein the alkylenimine is ethylenimine.

3. A process as in claim 2 wherein the catalyst precursor is potassium metal.

4. A process as in claim 3 wherein the ethylenimine is heated in the presence of an inert solvent.

5. A process as in claim 4 wherein the inert solvent is benzene, triethylamine or hexane.

6. A process as in claim 3 wherein the inert atmosphere is nitrogen, helium or argon.

7. A process as in claim 1 wherein the catalyst precursor is potassium metal.

8. A process as in claim 1 wherein the alkylenimine is heated in the presence of an inert solvent.

9. A process as in claim 7 wherein the inert solvent is benzene, triethylamine or hexane.

10. A process as in claim 1 wherein the inert atmosphere is nitrogen, helium or argon.

11. A process for preparing an alkylenimine dimer which comprises contacting an alkylenimine with from about 1 to about 5 percent by weight (as alkali metal), alkylenimine basis, of an alkali metal alkylenimide catalyst or precursor thereof, at a temperature of from about 90° to about 130° C. in an inert atmosphere, at a pressure of from about 15 p.s.i.g. to about 4,000 p.s.i.g., for a time of from about 2 hours to about 70 hours.

12. The process of claim 11 wherein the alkylenimine is ethylenimine, the alkali metal catalyst precursor is potassium, and the inert atmosphere is nitrogen.

References Cited

Fanta, the Chemistry of Heterocyclic Compounds, vol. 19, part 1 (Interscience, 1964), edited by Weissberger, p. 557.

ALTON D. ROLLINS, Primary Examiner

U.S. Cl. X.R.

260—2

PO-1050
(5/69)

UNITED STATES PATENT OFFICE
CERTIFICATE OF CORRECTION

Patent No. 3,502,654          Dated March 24, 1970

Inventor(s) John D. Young

It is certified that error appears in the above-identified patent and that said Letters Patent are hereby corrected as shown below:

In Col. 2, line 40, after "metal" insert --alkylenimide is operable. The preferred alkali metal--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents